United States Patent Office 3,122,588
Patented Feb. 25, 1964

3,122,588
PROCESS FOR THE PRODUCTION OF ALDEHYDES
Benjamin Phillips and Donald L. Heywood, Charleston, W. Va., assignors to Union Carbide Corporation, a corporation of New York
No Drawing. Filed May 31, 1960, Ser. No. 32,527
3 Claims. (Cl. 260—601)

This invention relates to a process for the production of aldehydes. In one aspect this invention relates to a process for isomerizing vicinal epoxy hydrocarbons (i.e., a hydrocarbon containing a

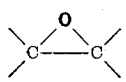

group) to produce aldehydes.

Heretofore, methods for the preparation of, for example, 2,2,3,3-tetramethylbutyraldehyde have been known. Hickinbottom [1] has prepared this aldehyde by contacting 2,4,4-trimethyl-2,3-dihydroxypentane with sulfuric acid in aqueous ethanol. Among the disadvantages of the method disclosed by Hickinbottom are (a) low yield of the aldehyde and (b) production of major amounts of other products.

According to this invention, a process for isomerizing vicinal epoxy hydrocarbons having the formula

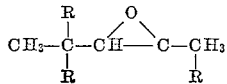 (I)

wherein the R groups individually represent members selected from the group consisting of lower alkyl radicals, cycloalkyl radicals and aryl radicals, has been discovered. Said process comprises contacting said vicinal epoxy hydrocarbon with a catalyst comprising an alkali metal phosphate at a temperature sufficient to maintain said vicinal epoxy hydrocarbon in an essentially vapor state.

By the practice of this invention, said vicinal epoxy hydrocarbon is isomerized into valuable products. The major product of the isomerization is an aldehyde having the formula

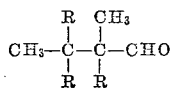 (II)

wherein the R groups individually represent members selected from the group consisting of lower alkyl radicals, cycloalkyl radicals and aryl radicals.

In addition to the isomerization by which the epoxy group is changed into an aldehyde, it is noteworthy that there is an unexpected rearrangement of the carbon atoms such that the carbon atom that is in the 3 position in the starting epoxide will end up as the terminal aldehyde carbon atom in the final product. By the process of this invention the yields of said aldehyde product are surprisingly high while only minor amounts of other products are formed.

It is an object of this invention to provide a process for the production of aldehydes. It is another object of this invention to provide a catalytic reaction for effecting the isomerization of vicinal epoxy hydrocarbons to aldehydes.

[1] W. Hickinbottom, J.C.S., 1948, 284.

It is a further object of this invention to provide a process for the production of aldehydes from vicinal epoxy hydrocarbons in high yield. Other objects of the invention will become apparent to those skilled in the art upon referring to the detailed description below.

The vicinal epoxy hydrocarbons which can be employed in this invention are those having the formula

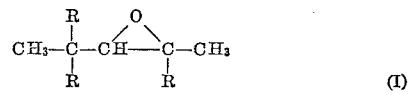 (I)

wherein the R groups individually represent members selected from the group consisting of lower alkyl radicals, cycloalkyl radicals and aryl radicals. The lower alkyl radicals contemplated are those having from 1 to 4 carbon atoms, and the like, such as methyl, ethyl, propyl, isopropyl, butyl and isobutyl radicals, and the like. Among the cycloalkyl radicals contemplated by this invention are cyclopentyl and cyclohexyl radicals, their methyl-substituted homologues, and the like. Included among the aryl radicals contemplated are the phenyl and naphthyl radicals, their methyl-substituted homologues, and the like.

Examples of vicinal epoxy hydrocarbons which are operative in the process of this invention include the following:

2,3-epoxy-2,4,4-trimethylpentane
3,4-epoxy-2,2,4-trimethylhexane
2,3-epoxy-2-phenyl-4,4-dimethylpentane
3,4-epoxy-2,4-dimethyl-2-phenylhexane
3,4-epoxy-2,2,4,5,5-pentamethylhexane
3,4-epoxy-2,4-dimethyl-2-cyclohexylhexane
2,3-epoxy-4,4,6-trimethyl-2-cyclopentylheptane
2,3-epoxy-2,4,4,6,6-pentamethylheptane The preferred class of vicinal epoxy hydrocarbons are those in which the R groups in general Formula I are lower alkyl groups. The most preferred species is that in which the R groups are methyl groups, that is, 2,3-epoxy-2,4,4-trimethylpentane.

The vicinal epoxy hydrocarbons employed in this invention can be prepared by methods which are well known in the art. For example, the corresponding olefin can be epoxidized by contacting said olefin with an aldehyde monoperacylate according to the method disclosed in U.S. Patent No. 2,785,185.

The catalysts employed in this invention are the alkali metal orthophosphates, such as trilithium phosphate, trisodium phosphate and tripotassium phosphate. The preferred catalyst is trilithium phosphate.

The catalyst can be prepared by various methods known to the art. For example, one method of preparing trilithium phosphate is to mix an aqueous solution of a soluble lithium salt, such as lithium nitrate, with an aqueous solution of trisodium phosphate. Trilithium phosphate, which is only sparingly soluble in water, then precipitates out of solution. The precipitate is filtered and thoroughly washed to remove impurities. The filter cake can either be extruded into rods while wet, or dried and broken up into particles of the desired size.

If desired, the catalyst can also be deposited on conventional catalyst supports, such as pumice, silicon carbide and the like.

The process of this invention is carried out at a temperature sufficient to maintain the vicinal epoxy hydrocarbon in a vapor state. The maximum permissible temperature is that temperature at which decomposition of the epoxide or the aldehyde product occurs. These temperatures correspond to a range of about 250° C. to about 500° C. At the lower end of this range, conversion of the epoxide begins to diminish, and at the upper end of the range, the incidence of undesired side reactions starts to become high. The preferred temperature range is therefore from about 300° C. to about 400° C. The most highly preferred temperature range is from about 325° C. to about 375° C.

The pressure at which the reaction is carried out is not a critical feature of the invention. Sub-atmospheric, atmospheric and superatmospheric pressures can be employed. The only limitation is that the pressure should not be so high that the boiling point of the epoxide is raised above its decomposition temperature. Generally, essentially atmospheric pressure is employed, with the single modification that it is desirable to introduce the epoxide feed material under a slight pressure in order to compensate for the pressure drop caused by such factors as the catalyst bed, packing, and the like.

It is preferred that the reaction be carried out in an inert atmosphere. Gases such as nitrogen, helium, and the like can be introduced into the reaction along with the epoxy feed material, in order to exclude oxygen. If oxygen is present in significant quantities it is likely to cause undesired side reactions, including the oxidation of the aldehyde product to the corresponding acid. Other substances which should be excluded from the reaction mixture are those which are reactive to the epoxy feed material or to the aldehyde product. These include, for example, primary and secondary amines, acid anhydrides, alcohols, and others which are apparent to those skilled in the art.

It is preferred that the process of this invention be carried out on a continuous basis. This does not preclude the possibility of carrying out the reaction on a batch or semicontinuous basis; however, as is well known in the art, a vapor phase reaction is most conveniently and economically carried out continuously.

Where the reaction is carried out continuously, the rate of feed of the vicinal epoxy hydrocarbon can be varied from about 15 grams to about 200 grams of epoxide per hour per 100 cubic centimeters of alkali metal orthophosphate catalyst. The preferred rate of feed is from about 30 to about 150 grams of epoxy per hour per 100 cubic centimeters of catalyst, and the most highly preferred is from about 40 to about 100 grams of epoxy per hour per 100 cubic centimeters of catalyst. An excessively high feed rate could cause localized overheating of the catalyst bed. Said localized overheating could increase the incidence of undesired side reactions including decomposition of the epoxy or aldehyde.

The principal side reactions normally attendant with the process of this invention result in the formation of ketones and unsaturated alcohols. These are illustrated by the following equations:

(I) 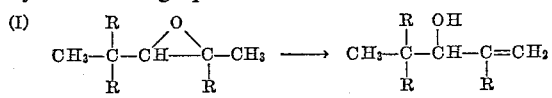

(II) 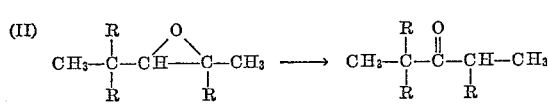

The incidence of these side reactions remains relatively low when the reaction is carried out within the preferred temperature range.

The vicinal epoxy hydrocarbon can be introduced into the reaction either in the liquid state or in the vapor state. The epoxide can be dissolved in an inert solvent, such as benzene, toluene, octane, and the like, or it can be employed in 100 percent concentration. The preferred equipment is a conventional catalytic tube reactor, fitted with means suitable for heating the catalyst bed to the desired temperature. Since the reaction is exothermic, it is preferred that said means also be capable of taking away the heat of reaction after the reaction has started up. A "Dowtherm" jacket used in combination with electrical windings is satisfactory for this purpose. The outlet end of the reactor can be fitted with means for condensing and trapping the effluent vapors, such as a condensor. Suitable materials of construction for the reactor are stainless steel, glass, porcelain, copper, Monel, and the like.

The condensed vapors effluent from the reactor contain as the principal components unreacted vicinal epoxy hydrocarbon and the aldehyde product, as well as minor amounts of ketones and unsaturated alcohols. The components can be separated by various methods known to the art, such as fractional distillation, crystallization, isolation of the sodium bisulfite, semicarbazone and phenylhydrazone derivatives of the aldehyde, and the like. The unreacted epoxide can then be recycled over the catalyst.

The aldehyde products resulting from the practice of this invention have many uses, as is well known in the art. These uses include perfumes, odorants, and the like. These aldehydes are also quite useful as chemical intermediates. For example, the oxidation to the corresponding acid proceeds easily and with essentially no side reactions. The essential absence of side reactions comes from the fact that the aldehydes resulting from the practice of this invention have no hydrogen atoms attached to the carbon atoms which are alpha to the carbonyl group. Such carbon atoms are known to be the primary site of attack by oxygen leading to autoxidation and resultant side reactions. In addition, if the aldehyde is reduced to the corresponding alcohol, such alcohol is capable of forming an ester which has no hydrogen atoms attached to the carbon atom which is beta to the acyloxy group. Such an ester is unusually thermally stable, since it cannot undergo decomposition to the corresponding olefin and acid, and thereby finds utility, for example, as a plasticizer where thermal stability is a particular requirement.

The following non-limiting example is illustrative of the invention.

EXAMPLE

*Preparation of 2,2,3,3-Tetramethylbutyraldehyde*

A stainless steel tube having an internal diameter of one inch and a length of forty inches was packed with 100 ml. of filtros (a filtering medium made of silica bonded with a synthetic silicate and fused at temperatures above 2000° F.), a catalyst bed consisting of 100 ml. of solid trilithium phosphate in the form of cubes 6 mm. on a side, and another 100 ml. of filtros. Heat was supplied to the catalyst zone by electrical windings which heated a pressurized jacket containing "Dowtherm" to the desired pressure and temperature. The temperature was ascertained by means of a thermocouple enclosed in a thin tube running longitudinally through the reactor.

Concurrently with a slow stream of nitrogen, 94 grams of 2,4,4-trimethyl-2,3-epoxypentane were admitted to the upper end of the tube at the rate of 60 ml./hour (47 grams/hour). The catalyst zone was maintained at 350° C. to 375° C. during the reaction. The effluent vapors were condensed and collected in a glass trap immersed in ice water, and were found to weigh 87 grams. The condensate was fractionally distilled, and the portion which boiled at 144° C. to 150° C. was collected. This portion, which weighed 46 grams, was identified as 98.7 percent pure 2,2,3,3-tetramethylbutyraldehyde by the following procedure:

(1) The purity was determined by titration with hydroxylamine hydrochloride, which is a specific reagent for aldehydes.

(2) The 2,4-dinitrophenylhydrazone derivative was prepared. This derivative had a melting point of 162–3° C. Literature value is 163–164° C. (cf. Hickinbottom, J.C.S., 1948, 284).

(3) The aldehyde possessed a characteristic camphoraceous odor.

(4) A one-liter stainless steel bomb was charged with 198 grams of 2,2,3,3-tetramethylbutyraldehyde, 200 grams of absolute ethanol for solvent, and 12 grams of wet Raney nickel. The bomb was purged with hydrogen four times, then filled with hydrogen to a pressure of 200 p.s.i.g. and heated while being gently rocked. At 60° C., a rapid and exothermic uptake of hydrogen was observed which lasted for two hours. The final temperature was 158° C., with heat being applied during the latter stage of the hydrogenation.

The bomb was cooled and emptied, the contents filtered twice to remove all the Raney nickel, and the filtrate evaporated to a pressure of 2.5 mm. to leave 140 grams of a crystalline residue. The residue was identified as 90% pure 2,2,3,3-tetramethylbutanol-1, M.P. 136–139° C. The purity was determined by reaction with phthalic anhydride in pyridine. The infrared spectrum supported the assigned structure.

The remainder of the condensate from the isomerization consisted of unreacted 2,4,4-trimethyl-2,3-epoxypentane (30 grams) and unsaturated alcohols (11 grams).

What is claimed is:

1. A process for isomerizing a vicinal epoxy hydrocarbon of the formula:

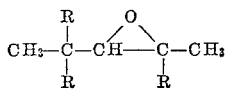

wherein each R individually represents alkyl of from 1 to 4 carbon atoms, said process comprising contacting said vicinal epoxy hydrocarbon with a catalyst selected from the group consisting of trilithium phosphate, trisodium phosphate, and tripotassium phosphate at a temperature in the range of from about 250° C. to about 500° C., and recovering the isomerized products resulting therefrom, the major isomerized product being an aldehyde of the formula:

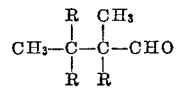

wherein each R individually represents alkyl of from 1 to 4 carbon atoms.

2. The process of claim 1 wherein said catalyst is trilithium phosphate.

3. A process for isomerizing 2,3-epoxy-2,4,4-trimethylpentane which comprises contacting 2,3-epoxy-2,4,4-trimethylpentane with a trilithium phosphate catalyst at a temperature of from about 250° C. to about 500° C., and recovering the isomerized products resulting therefrom, the major isomerized product being 2,2,3,3-tetramethylbutyraldehyde.

References Cited in the file of this patent

UNITED STATES PATENTS

| 2,031,200 | Baur | Feb. 18, 1936 |
| 2,426,264 | Fowler et al. | Aug. 26, 1947 |
| 2,660,609 | Robeson et al. | Nov. 24, 1953 |
| 2,686,205 | Gasson et al. | Aug. 10, 1954 |

FOREIGN PATENTS

| 331,185 | Great Britain | June 18, 1930 |

OTHER REFERENCES

Hickinbottom: Jour. Chem. Soc. (1948), pp. 1331–1333.